United States Patent [19]

Overocker

[11] Patent Number: 4,960,060
[45] Date of Patent: Oct. 2, 1990

[54] FERTILIZER INJECTOR

[76] Inventor: Lyle E. Overocker, R.R. 1, Milford, Iowa 51351

[21] Appl. No.: 408,198

[22] Filed: Sep. 15, 1989

[51] Int. Cl.⁵ ............... A01C 23/04; F16K 29/00; F16K 5/14
[52] U.S. Cl. ................... 111/128; 251/181; 251/309; 137/625.16; 137/625.47
[58] Field of Search ............ 251/174, 175, 176, 180, 251/181, 186, 309; 137/625.11, 625.16, 625.47; 111/128, 91

[56] References Cited

U.S. PATENT DOCUMENTS

| | | | |
|---|---|---|---|
| 4,545,408 | 10/1985 | Sonneborn | 251/175 X |
| 4,632,148 | 12/1986 | Stark | 251/175 X |
| 4,649,836 | 3/1987 | Overocker | 111/128 |
| 4,677,921 | 7/1987 | Brown | 111/128 |

Primary Examiner—Danton D. DeMille

[57] ABSTRACT

An improved seal for a fertilizer injector, such as that shown in my prior U.S. Pat. No. 4,649,836, providing a rotating sealing carrier which prevents scoring by the constant rubbing of the plate carrying the injectors. The improved seal also provides that the sealing bushing is pressed against the plate by liquid pressure from the liquid fertilizer.

8 Claims, 2 Drawing Sheets 4,960,060

FERTILIZER INJECTOR

BACKGROUND AND SUMMARY OF THE INVENTION

This invention pertains to a seal for a fertilizer injector of the type described in my previous U.S. Pat. No. 4,649,836, issued Mar. 17, 1987, and provides an improved seal and holder therefore, to distribute the fertilizer to the spoked injectors.

In my previous patent, I described a device adapted to inject fertilizer near the plant roots, thus providing for much more economical use of liquid fertilizer. This, as an incident of its use, also reduces the excess fertilizer on the ground which can later show up as a pollutant in ground water or surface water. Injecting the material, places it below the level at which surface water run-off will be affected. Also the use of the relatively smaller amounts, placed where the plant will use it, makes the fertilization just as effective while more apt to be fully absorbed by plant roots and thus, less likely to be leached into the ground water.

In that previous patent, I described a seal device between the stationary supply means for the fertilizer and the rotating disc carrying the injectors. This seal included principally a bushing formed of a plastic such as nylon across which the rotor plate slid as it rotated. The bushing was pressed against the plate by a resilient rubber-like washer which could be adjustably pressed by the bushing. While that method works reasonably well, I have discovered that the face of the bushing does sometimes become scored and scratched by irregularities on the face of the plate so that after a certain number of rotations, that scoring may result in sufficiently irregular wear as to cause leaks.

By my invention, I provide a simple means to rotate the bushing by small amounts as the rotor plate rotates so that the bushing is not always in the same position. Thus, scoring by repeated passage of the plate is reduced. Any wear is not continuous on the same part of the face of the bushing, but rather is spread so that the face wears more evenly. Also, by my invention, I reduce the need for adjustment of the bushing by providing that the pressure on the liquid fertilizer acts on the bushing to hold it against the rotor plate.

DESCRIPTION

Figure 1:
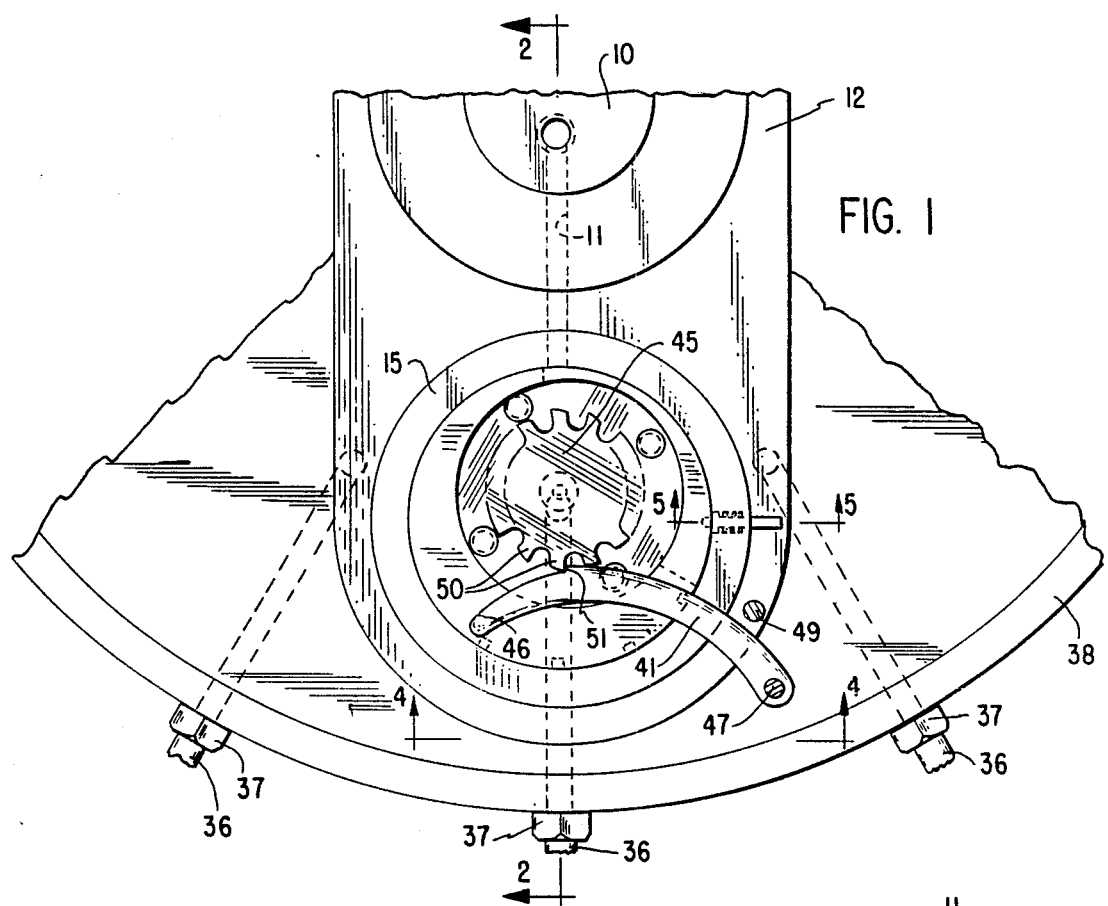
FIG. 1 is a partial end view of the rotor-stator assembly with the cover removed to show the interior of the rotor drum.

Briefly my invention comprises a new longer-lived seal adapted to carry liquid fertilizer from a stator in the type of fertilizer injector described in my U.S. Pat. No. 4,649,836 to the ducts formed in the rotor and to seal tightly the passage way for fertilizer when the ducts in the rotor are not open to that passage.

More specifically, and referring to the drawings, I illustrate my device mounted on a stationary axle 10 as in my previous patent. At least one duct 11 is formed in the axle 10 to carry liquid fertilizer from a source or tank not shown to the stator.

In my previous device, the stator was a full disk. I have found that form to be unnecessary, and now use only a much smaller plate 12 which may be clamped to the axle 10. The plate 12 is formed to provide a duct 13 (FIG. 2) extending from the radial portion 7 of the duct 11 in the axle radially outward. Mounted on the stator plate 12 is a seal housing 15. A ring 16 may be threaded into this housing. O-rings 17 are adapted to seal the exit from the duct 13 so that fluid will flow into a passageway 18 in the ring 16. Although I have illustrated and described the ring 16 as threaded into the housing 15, it will be obvious that there are other ways of holding the ring in place. For example, the housing 15 might be extended above (in the figures) the top of the ring 16, and a snap ring installed to hold the ring in place.

The ring 16 houses a seal carrier 21 having a shaft portion 20 journalled in the ring 16 by a bearing 19 which is preferably a ball bearing. The carrier 21 has one face formed in a cup shape so as to hold a seal member 24 within that cup. That seal 24 in turn is formed to hold a removable orifice member 26. In order to provide axial adjustment of the seal 24 against the rotor plate 35 and to accomodate wear on the bearing, the shaft 30 is slideably moveable within the inner race of the bearing 19.

The entire assembly is designed to allow the flow of fluid from the ducts 11 and 13 into the passageway 18. For that purpose, the shoulder 28 between the shaft part 20 and the enlarged part of the carrier 21 is placed so that an annular chamber is formed to receive fluid from the passageway 18. Because that fluid is under pressure, it presses the carrier toward the rotor plate 35 to hold the seal against that plate. From the chamber, the fluid flows through a passageway formed of a radial hole 29 to an axial hole 30 extending through the carrier 21 and through the seal member 24 and orifice member 26.

The rotor is similar to that of my previous patent. It consists of a plate 35 which carries the injectors 36 including the hexagonal heads 37 by which the injectors are tightened into the plate 35. A drum 38 and cover 39 complete the rotor. In order to transmit the fluid from the seal 24 through the orifice 27 into the injector 36. A passageway 40 is formed in the plate. The entrance 41 to that passageway is at a radius from the center of rotation of the rotor such that it will pass the exit from the orifice 27 in the seal each time the rotor passes the seal.

Figure 4:
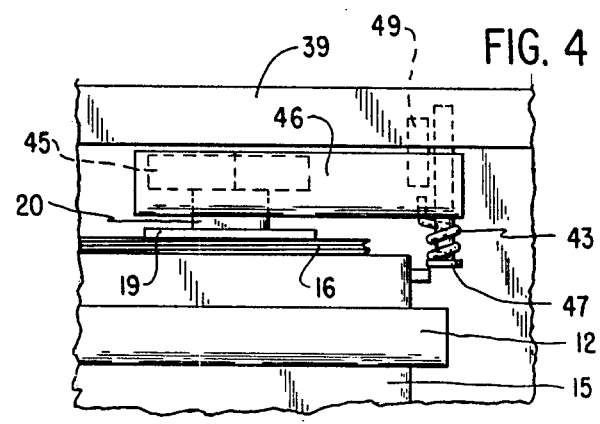
FIG. 4 is a partial view from line 4—4 of FIG. 1.

As thus far described and except for the means providing the force pressing the seal to the rotor, the device is very similar to that of my previous patent. The other improvement in the present embodiment comprises a novel means of preventing scoring on the face of the seal 24 as it is rubbed by the plate 35 as it turns. I accomplish this by turning the seal slightly at each rotation of the rotor. To accomplish the turning, a ratchet wheel 45 is mounted on the end of the shaft 20. This wheel is in position to be engaged by a pawl 46 which is fastened to the cover 39 by a pin 47 (FIG. 4). A spring 48 is used to press the pawl 46 into contact with the ratchet. A stop pin 49 mounted on the cover 39 may be used to prevent the pawl 46 from moving beyond the point at which the cam surface 45 on the pawl will properly engage the ratchet. It will be apparent that as the rotor turns a full revolution, the pawl 46 will be carried to a place where the surface of the pawl 46 will slide onto the ratchet 45, and then to where the ratchet teeth 50 will be engaged by the step 51 on the pawl 46. As the rotor continues, the ratchet wheel 45 will be turned a short distance to move the seal 21 rotatably through a few degrees of rotation. That turning will be sufficient to prevent the seal 21 from presenting the same path across its face to the disk. Thus, any incipient groove in the face of the seal 21 will be rotated out of the path of whatever irregularity on the plate 35 might be causing the groove, and the wear on the seal will be equalized.

Although it is not necessary for the successful operation of the device, provision may be made for varying the flow rate of liquid through the machine. One simple way is by using orifice members 26 having openings of varying sizes. This means is effective and is readily possible because of the use of a separate orifice member.

Figure 2:
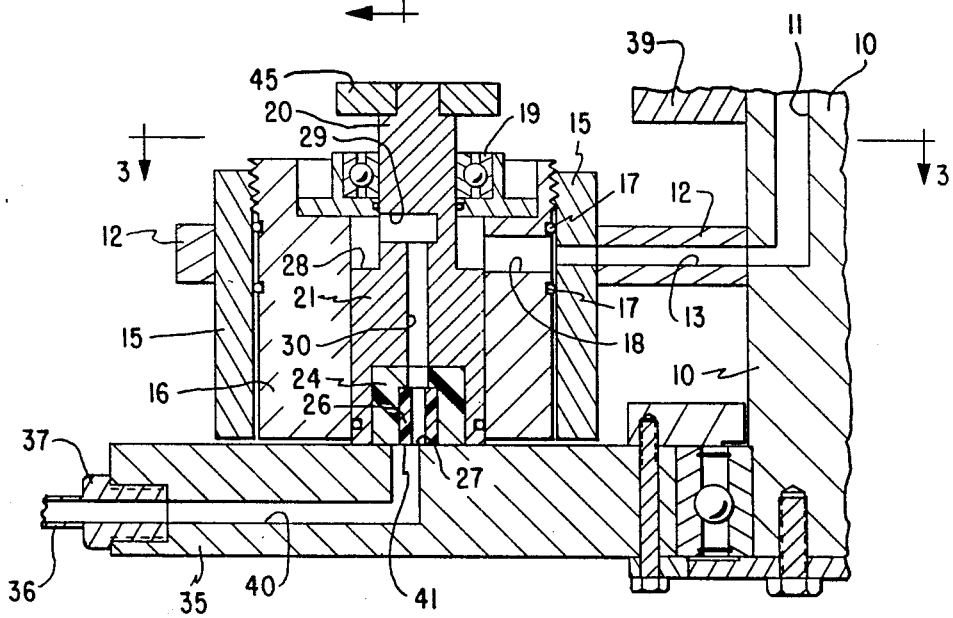
FIG. 2 is a radial sectional view from line 2—2 of FIG. 1
Figure 3:
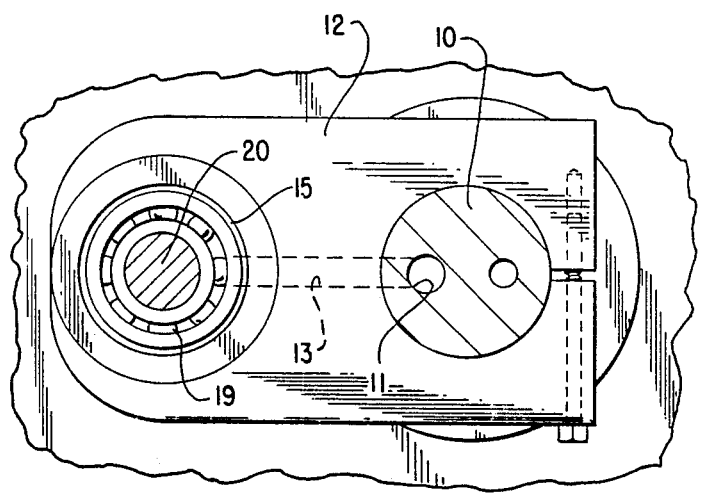
FIG. 3 is a sectional view from line 3—3 of FIG. 2.

Another means of accomplishing the same purpose is also illustrated in the drawings. As shown in FIGS. 1 and 2, the seal carrier 21 is mounted somewhat off from the centerline of the ring 16. Thus, the orifice 27 is not on the centerline of rotation of the ring 16 as it is screwed into the housing 15. The entrance 41 to the passage 40 is directly on the path of the centerline of the housing so that rotation of the ring 16 will carry the orifice 27 into and out of the circle defined by the rotation of the entrance 41. Thus, when the ring is in the position shown in FIGS. 1 and 2, the orifice 27 is not completely in register with the entrance 41. This reduces the area through which the fluid flows from the passage 30 into the passage 40. Therefore, the amount of fluid passing through in the limited time available as the rotor turns is reduced below what it would be if there were full registration. However, by turning the ring a few degrees—at most 90°—the radial location of the orifice 27 can be moved to a line where it will be in full registration and a larger flow will result. Thus, by the off-center location, I can provide a readily adjustable flow rate of material through the injectors.

Figure 5:
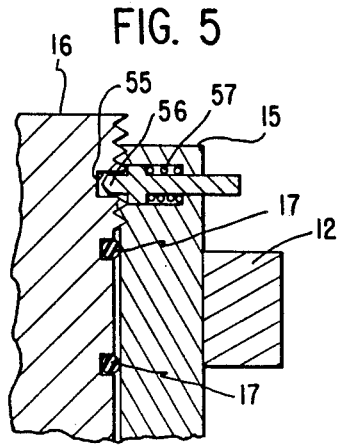
FIG. 5 is a partial sectional view from line 5—5 of FIG. 1.

In order to be certain that the flow rate stays constant while in use, the ring 16 (FIG. 5) is formed with a series of holes 55 into which a pin-type detent 56 will fit. Such a detent provides a positive lock to rotatIon of the ring 16. The detent is mounted in the housing 15 and may be biassed by a spring 57 to a position in one of the holes 55.

It will be apparent that the improved embodiment provides a longer-lived seal because of the more even wear on the face of the seal. It also provides a simple means by which pressure is effective to hold the seal tightly against the face of the rotor plate. In addition, the off-center location of the seal allows an easy and convenient device to adjust the flow of material through the injectors.

I claim as my invention:

1. In a device for injecting a fluid into the earth including a rotor and a stator, said stator including a fixed axle, a stator plate fixed to said axle and housing means on said stator plate, said rotor including a rotor plate rotatably mounted on said axle injector means mounted on said rotor plate, drum means attachable to said rotor plate and cover means for said drum means, said rotor and said stator both being formed to provide passageways and ducts to conduct said fluid through said stator and to said injector means, the improvement which comprises a mounting means on said stator, seal means rotatably mounted in said housing, said seal means being formed to provide a passage for said fluid from said stator to said, rotor and being in slidable contact with said rotor plate, and operating means engageable between said rotor and said seal means to require said seal means to be rotated positively relative to the housing.

2. The improvement described in claim 1 in which said operating means engageable between the rotor and seal means is engaged intermittently so as to cause said seal means to be rotated in incremental steps.

3. The improvement of claim 1 in which said seal means includes a seal carrier rotatably mounted in said housing, a seal member carried by said carrier, said seal member including an interchangeable orifice member whereby the cross sectional area of said passage can be selectively varied to provide for adjustment of the flow rate of said fluid.

4. The improvement of claim 3 in which said carrier is formed with a shoulder, said shoulder in combination with said housing formed a chamber in said passage for said fluid whereby pressure on said fluid causes force on said shoulder to press said seal means against said rotor plate.

5. The improvement of claim 1 in which said seal means includes a seal carrier rotatably mounted in said housing, said means engageable between said rotor and said seal means including a ratchet wheel on said carrier and a pawl on said rotor whereby engagement between said pawl on each revolution of said rotor turns said ratchet wheel an increment to rotate said seal means.

6. The improvement of claim 1 in which said mounting means includes a seal housing forming a part of said stator, ring means rotatably adjustable in said housing, a seal carrier rotatably mounted in said ring means on a centerline slightly eccentric of the centerline of said ring means, whereby rotation of said carrier will adjust the registration of the exit of said passage in said seal means with the entrance to said passageway in said rotor to adjust the rate of flow of said fluid.

7. The improvement of claim 6 in which means on said ring means is releasably, positively engageable with said carrier to hqld said carrier in an adjusted, rotated position.

8. The improvement of claim 6 in which said seal means includes a seal carrier rotatably mounted in said housing, said means engageable between said rotor and said seal means including a ratchet wheel on said carrier and a pawl on said rotor whereby engagement between said pawl on each revolution of said rotor turns said ratchet wheel an increment to rotate said seal means.

* * * * *